United States Patent [19]

Miyazaki

[11] 4,324,477

[45] Apr. 13, 1982

[54] PHOTOGRAPHIC TRIPOD APPARATUS

[75] Inventor: Kiyoshi Miyazaki, Tokyo, Japan

[73] Assignee: Kabushiki Kaisha L.P.L, Japan

[21] Appl. No.: 207,965

[22] Filed: Nov. 18, 1980

[51] Int. Cl.³ ...................... G03B 17/00; F16M 11/38
[52] U.S. Cl. ..................................... 354/293; 248/171
[58] Field of Search ................. 354/81, 293; 248/163, 248/168–171

[56] References Cited

U.S. PATENT DOCUMENTS

| | | | |
|---|---|---|---|
| 1,014,381 | 1/1912 | Force | 248/171 X |
| 1,093,750 | 4/1914 | Welby | 248/170 |
| 1,517,825 | 12/1924 | Bruneau | 248/171 |
| 2,709,560 | 5/1955 | Resk | 248/169 |
| 2,962,251 | 11/1960 | Karpf | 354/293 X |

*Primary Examiner*—Donald A. Griffin

*Attorney, Agent, or Firm*—Steinberg & Raskin

[57] ABSTRACT

Photographic tripod apparatus which is easily transportable and wherein the legs thereof can be held in their collapsed position and released therefrom in a simple and reliable manner. In one embodiment, one of the legs is provided with a handle and a latch mechanism is provided between a portion of the leg adjacent to the handle and a slidable member on the sleeve type bushing by which the legs can be maintained in their collapsed position and released therefrom by the same hand as that holding the handle in a one touch manner. In second and third embodiments, one of the legs is provided both with a handle and with a bundling mechanism which holds the legs together in a bundled fashion, the bundling mechanism preferably being releasable by the same hand which holds the handle.

16 Claims, 10 Drawing Figures

PHOTOGRAPHIC TRIPOD APPARATUS

BACKGROUND OF THE INVENTION

The present invention relates generally to photographic tripod apparatus and, more particularly, to photographic tripod apparatus having a handle mounted on one of the legs thereof to provide ease in portability and enhancement of appearance.

It is well known that the primary function of a photographic tripod is in the prevention of camera vibration during the photographing operation due to external shock or the like. However, photographic tripod apparatus must also be designed with its portability in mind especially when the same is used for outdoor photography. Further, as technological developments accelerate in the photography industry, refinements in the design appearances of cameras are becoming important and the same is true for tripod apparatus for use in connection therewith.

Generally, a photographic tripod is transported or transferred from one location to another by the provision of a separate hanging strap or by the photographer directly holding or grasping the legs thereof. The former manner of transport is rather inconvenient in that the tripod disadvantageously tends to swing as the photographer walks. Additionally, the provision of separate hanging straps detracts from the appearance of the tripod and, furthermore, the hanging strap also tends to encumber the operation of the tripod during use. The latter method wherein the photographer grasps the legs of the tripod during transport or transfer is also disadvantageous in that the legs may inadvertently and unintentionally open during such transport. Further, the legs of the tripod cannot be conveniently held since the same are not formed for this purpose.

Tripod apparatus are known wherein a slidable member is provided along a vertically extending sleeve-type bushing so as to be slidable along its length. Linkage rods are provided, each of which has one end pivotally mounted on a respective leg of the tripod and its other end pivotally mounted on the slidable member. The slidable member can be fixed by a set screw or the like at a particular desired position along the bushing in order to maintain the legs at a desired degree of opening through the linkage rods described above. Such a conventional tripod can be transported by holding the legs after the same have been completely collapsed and the slidable member fixed in position to the bushing by the set screw. However, this arrangement is not entirely satisfactory in that the accessibility, maneuverability and operability of the screw after the legs have been completely collapsed are not good. Moreover, the space available between the collapsed legs in the bushing is so small that the legs cannot be effectively or conveniently grasped by the hand.

SUMMARY OF THE INVENTION

Accordingly, one object of the present invention is to provide new and improved photographic tripod apparatus which overcomes the disadvantages described herein above.

Another object of the present invention is to provide new and improved photographic tripod apparatus which can be reliably and easily transported or transferred from one location to another.

Still another object of the present invention is to provide new and improved photographic tripod apparatus which has an enhanced design appearance.

Briefly, in accordance with the present invention, these and other objects are attained by providing in one embodiment photographic tripod apparatus wherein one of the legs thereof is provided with a handle and, additionally, a latch mechanism is provided between a portion of the leg adjacent to the handle and the slidable member on the sleeve-type bushing whereby the legs can be held in their collapsed position. The latch mechanism is adapted to be releasable by the same hand which holds the handle in a one touch manner to open the legs from their collapsed position.

According to additional embodiments of the invention, in addition to the provisions of a handle on one of the legs of the tripod apparatus, a bundling mechanism is provided for bundling or holding the legs together in their collapsed position. In a preferred arrangement, the bundling mechanism is releasable by the same hand as that which holds the handle.

DESCRIPTION OF THE DRAWINGS

A complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Referring now to the drawings where like reference characters designate identical or corresponding parts throughout the several views, and more particularly to FIGS. 1-6 which illustrate a first embodiment of the invention, tripod apparatus are illustrated including a base plate 20 to which are pivotally mounted three legs 11, 12 and 13, each of which can be expanded and contracted in a well known manner such as through a telescoping arrangement. The tripod is supported on the ground at the lower ends of each of the legs 11, 12 and 13, which are provided with respective ferrules 11a, 12a and 13a which insure a secure resting engagement of the tripod apparatus on the ground.

As noted above, the upper ends of the respective legs 11, 12 and 13 are respectively pivoted to the base plate 20 which serves as a pivot so that the opening angle of each of the three legs can be adjusted as desired. An elevator support 30 extends through a central portion of the base plate 20 and a mount 31 for a pan head 100 (FIG. 6) is fixed to the upper end of the elevator support 30. An elevator control wheel 21 is provided at the side of the base plate 20 and constitutes a mechanism, known per se, for adjusting the height of the elevator support 30 and, consequently, the pan head 100. A clamping knob 22 is provided for fixing the elevator support 30 after its vertical displacement by the elevator wheel 21 to its desired position.

A sleeve-type bushing 40 is fixed to and extends downwardly from the underside of the base plate 20 having a lower end which terminates in the region of the lower end of the elevator support 30 so that the latter is enclosed and vertically guided within the bushing 40.

A slidable member 50 is slidably provided around the outer periphery of the bushing 40 so as to be axially movable over the length of the bushing 40. Three pairs of substantially radially extending fins or flanges 50a project outwardly from the slidable member 50 so that each pair of fins receive within the space defined therebetween an end of one of three respective linkage rods 51, 52 and 53 which is pivotally mounted thereto. The other ends of each of the linkage rods 51, 52 and 53 are pivotally mounted to respective ones of the legs 11, 12, 13 at portions thereof adjacent to their lower ends.

The particular interconnection of the legs 11, 12 and 13 to the slidable member 50 through the linkage rods 51, 52 and 53 operates such that vertical movement of the slidable member 50 along the sleeve-type bushing 40 results in the legs 11, 12 and 13 being pivotally controlled so that the opening angle defined by these legs at the base plate 20 can be controlled. The legs will be completely collapsed when the slidable member is moved to its uppermost vertical position on the bushing 40.

According to the present invention, one of the legs, such as leg 12 in the present embodiment, is provided on its outwardly facing side with a handle member 60. The handle member 60 preferably has a substantially U-shape and is mounted on the leg 12 by a pair of clamping strips 63a and 63b fitted over lateral end portions 61a and 61b which abut against the outer side of the leg 12. Rivets 62a and 62b pass through the respective clamping strips and lateral portions so as to fix the handle 60 in the position illustrated. Of course, other means can be utilized for fastening the handle to the leg such, for example, as threaded fasteners, welding, etc.

The handle 60 is hollow and accommodates within its interior a substantially L-shaped latch lever 70 which is rotatably mounted within the handle by means of a pivot pin 71 (FIGS. 2 and 3) fixed to a substantially L-shaped mounting plate 77 which itself is fixed to the outer side of leg 12. The handle 60 has an opening 68 (FIGS. 4 and 5) formed through one of its sides adjacent to the lower lateral portion 61b opening into the interior of the handle. The latch lever 70 is formed with an angled portion 76 which passes through the opening 68 so that an inner end 72 of the latch lever is located within the interior of the handle 60 while an outer end 73 projects externally thereof.

Figure 1:
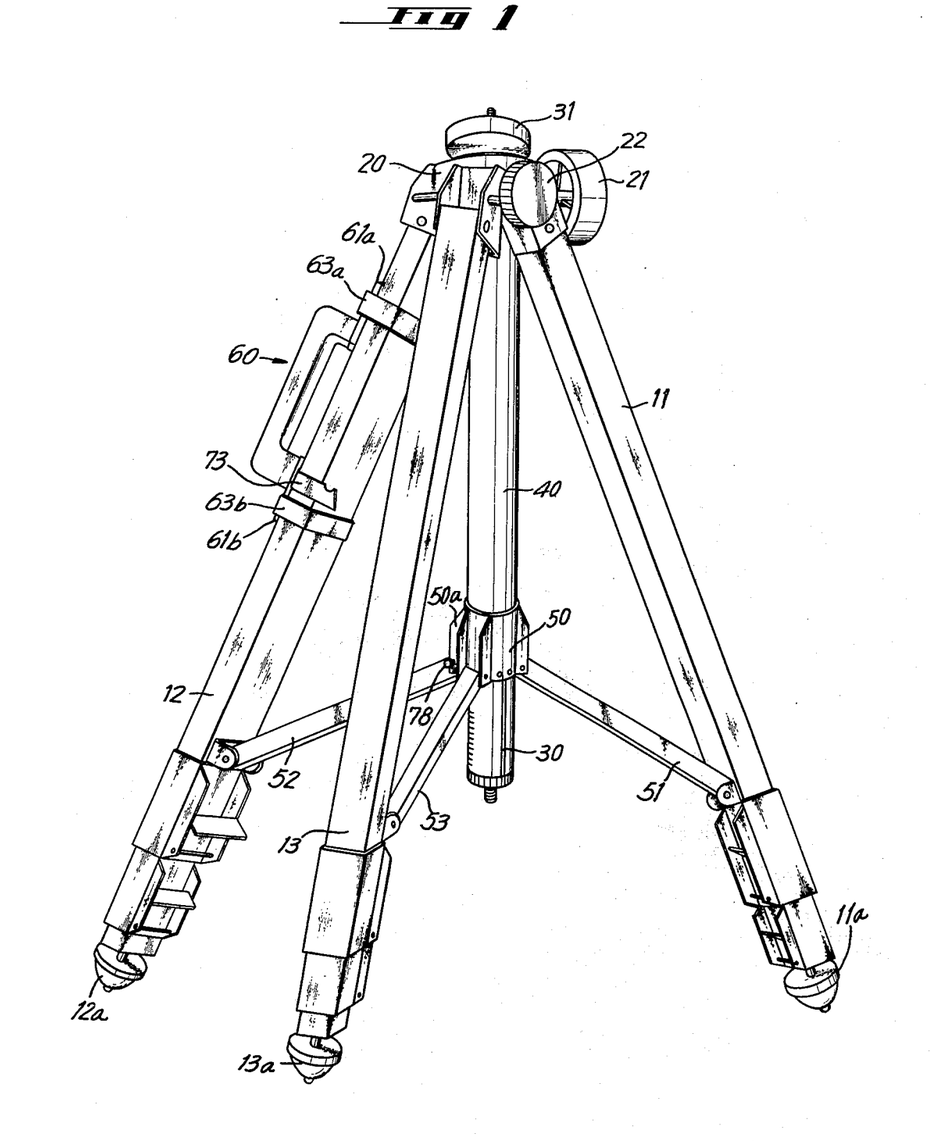
FIG. 1 is a perspective view illustrating a first embodiment of the photographic tripod apparatus according to the present invention.
Figure 2:
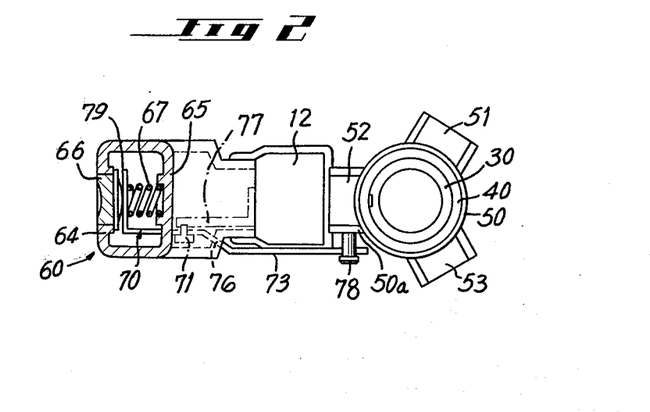
FIG. 2 is a plan view partially in section illustrating the handle and latch mechanism of the embodiment of the invention illustrated in FIG. 1 when the tripod apparatus is in its collapsed position.
Figure 3:
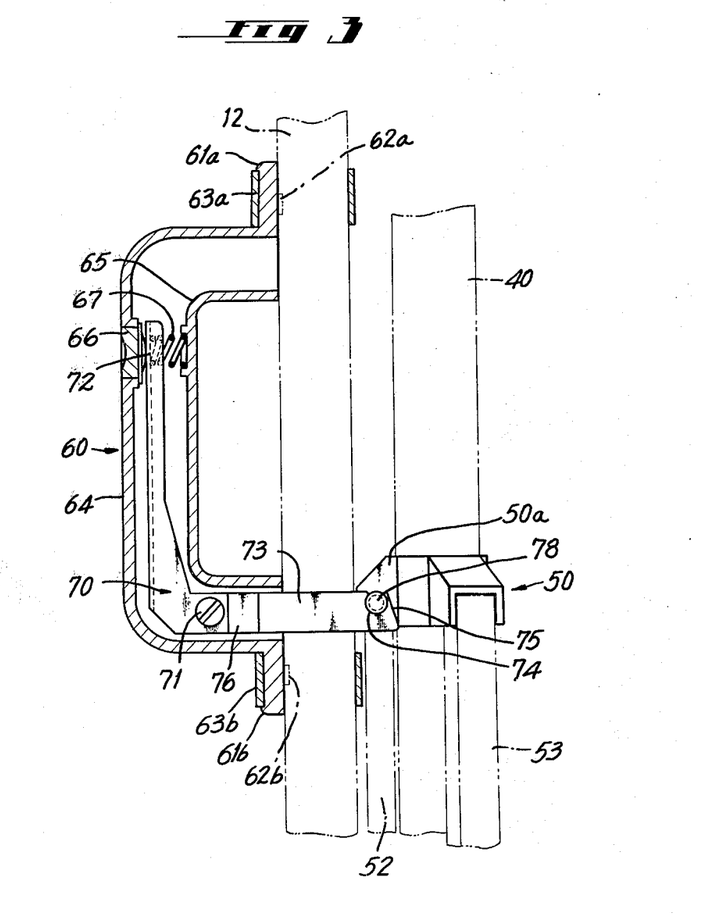
FIG. 3 is a side elevation view partially in section illustrating the handle and latch mechanism of the embodiment of the invention illustrated in FIG. 1 wherein the tripod apparatus is in its collapsed position.

A button 66 having a concave head is mounted in an outer wall 64 of the handle 60 so as to be movable between an outer and an inner position. A spring 67 is arranged so that its ends respectively bear against a portion 79 of the latch lever 70 and an inner wall 65 of handle 60 whereby the inner end 72 of the latch lever 70 bears against the front end of the button 66 so that the button is normally biased to its outer position as seen in FIGS. 2 and 3. In other words, the spring 67 is arranged such that the latch lever 70 is normally biased in a counterclockwise direction as seen in FIG. 3 around the pivot pin 71 to normally bias the upright portion 79 thereof against the button 66.

The outer end 73 of latch lever 70 is provided with a notch 74 into which a pin 78, described below, is adapted to be received. Further, the forward edge 75 of the outer end 73 of the latch lever 70 is slanted upwardly as best seen in FIG. 3.

A pin 78 is mounted on one of the fins 50a of the pair of fins to which the linkage rod 52 is pivotally mounted and on the side corresponding to the side of leg 12 to which the outer end 73 of latch lever 70 is adjacent. The pin 78 is appropriately formed so as to be engageable by the notch 74 on the outer end 73 of latch lever 70. Preferably, the outer end 73 of latch lever 70 and pin 78 are adapted to be in proximate latching relationship when the slidable member 50 is in its vertically uppermost position on the bushing, i.e., when the legs 11, 12 and 13 are in their collapsed position.

Figure 4:
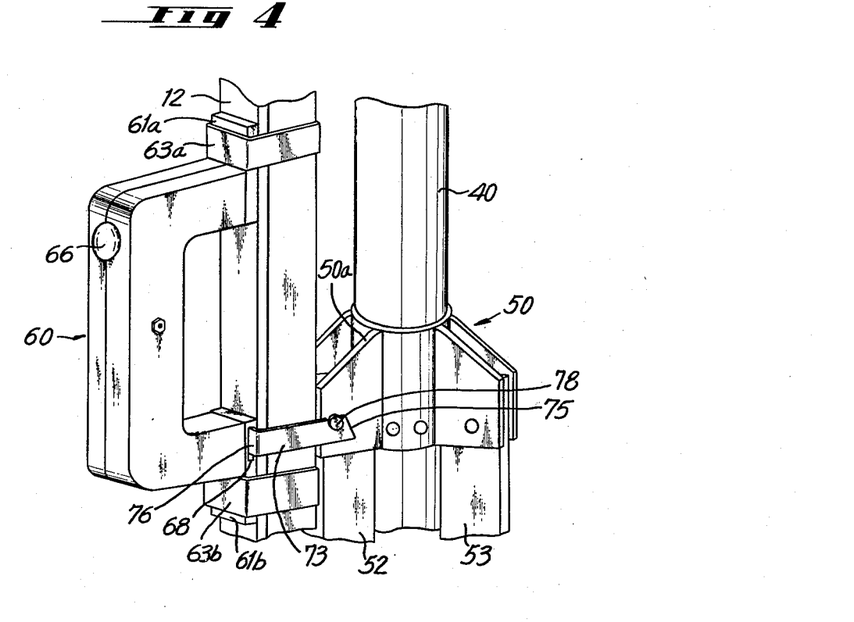
FIG. 4 is a detail view in perspective of the handle and latch mechanism of the embodiment illustrated in FIG. 1 wherein the latch mechanism has been engaged with the tripod apparatus in its collapsed position.
Figure 5:
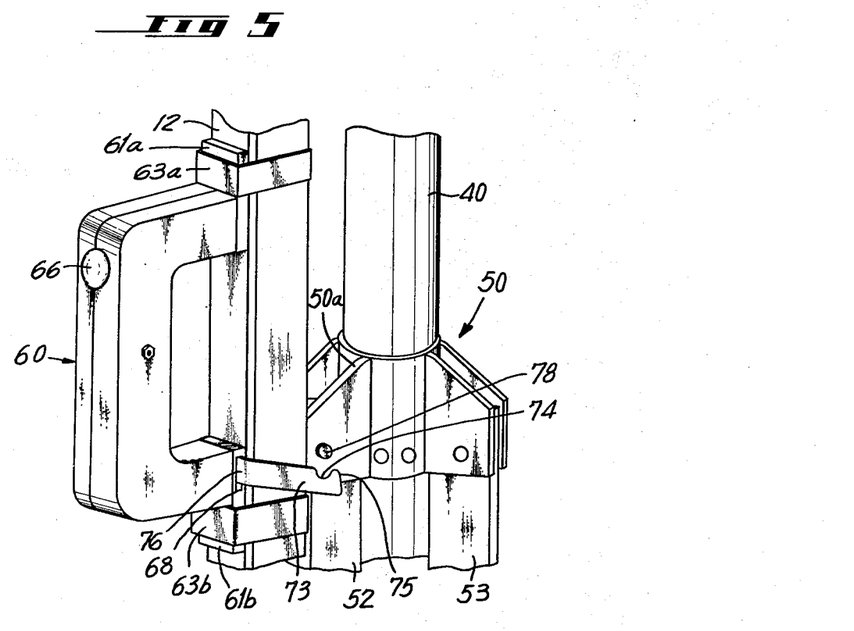
FIG. 5 is a view similar to FIG. 4 wherein the latch mechanism is illustrated just prior or subsequent to being in latching engagement.
Figure 6:
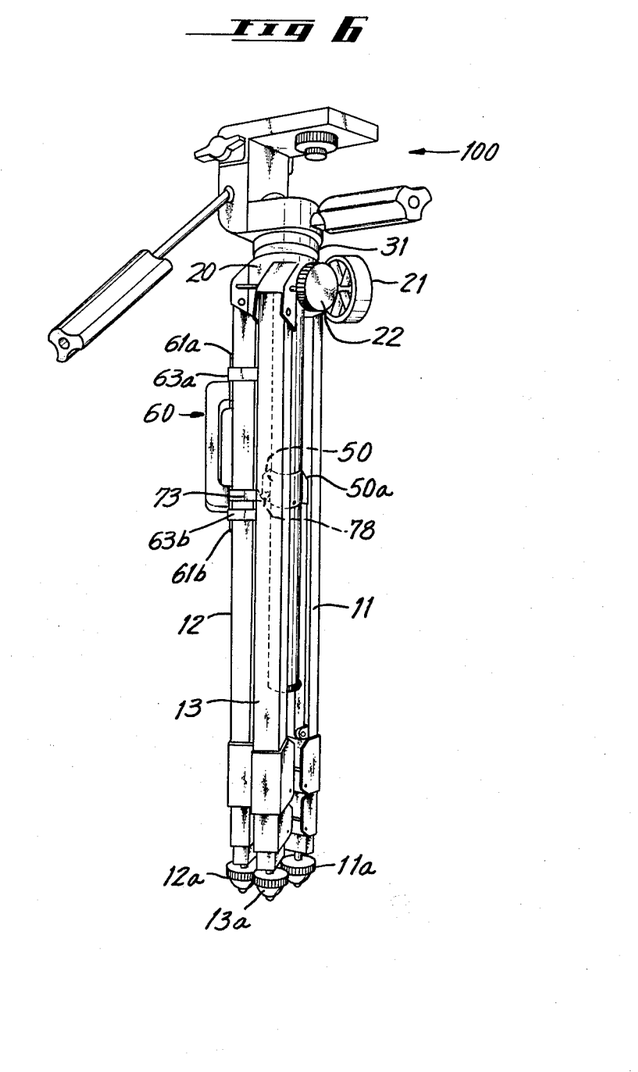
FIG. 6 is a perspective view of the embodiment of the tripod apparatus illustrated in FIG. 1 in its collapsed form and also illustrating a pan head mounted thereon.

The embodiment of the invention illustrated in FIGS. 1-6 operates in the following manner. In order to collapse the apparatus, the handle 60 is held in one hand whereupon one of the legs 11, 12 and 13 is pushed against the bushing 40 thereby causing the linkage mechanism to collapse the legs 11, 12 and 13 whereupon the slidable member 50 is vertically displaced along the bushing 40 upwardly until it is in opposed relationship to the slanted edge 75 of the outer end 73 of the latch lever 70. At this time the pin 78 associated with the slidable member 50 is urged against the slant edge 75 of the latch lever 70 whereupon the latch lever 70 is rotated in a clockwise direction through the engagement of the pin with the slant edge until the pin 78 is received in and engages the notch 74 (FIGS. 3 and 4). In this manner, the legs are latched together in their collapsed position. To open the legs, it is only necessary to depress the button 66 with a fingertip, preferably the thumb, of the same hand which is holding the handle 60. In this manner, the latch lever 70 is rotated in a clockwise direction against the biasing force of the spring 67 until the pin 78 is disengaged from the notch 74. Upon disengagement, the leg 12 may be pulled while holding one of the legs 11 or 12 or, alternatively, the weight of the legs may be utilized to open the same.

Although the latch lever 70 is illustrated in connection with the presently disclosed embodiment as being accommodated within the interior of a hollow handle 60 to constitute the latch mechanism of the present invention, it is understood that the latch lever can also be disposed adjacent to the handle 60. Alternatively, the pivot pin 71 can be mounted directly on the side of the handle 60 instead of being mounted on the mounting plate 77 which itself is fixed to the leg 12.

Referring now to FIGS. 7 through 10, additional embodiments of the present invention will now be described, it being understood that descriptions of conventional features of tripod apparatus not forming any part of the present invention are omitted.

Figure 7:
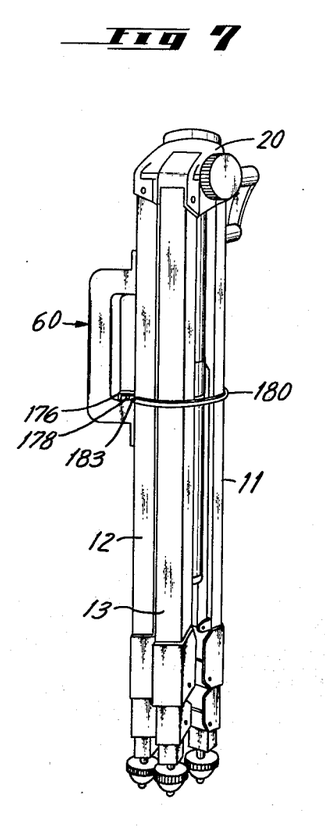
FIG. 7 is a perspective view illustrating a second embodiment of the photographic tripod apparatus of the present invention in its collapsed form with the legs thereof being bundled together by a bundling mechanism according to the present invention.
Figure 8:
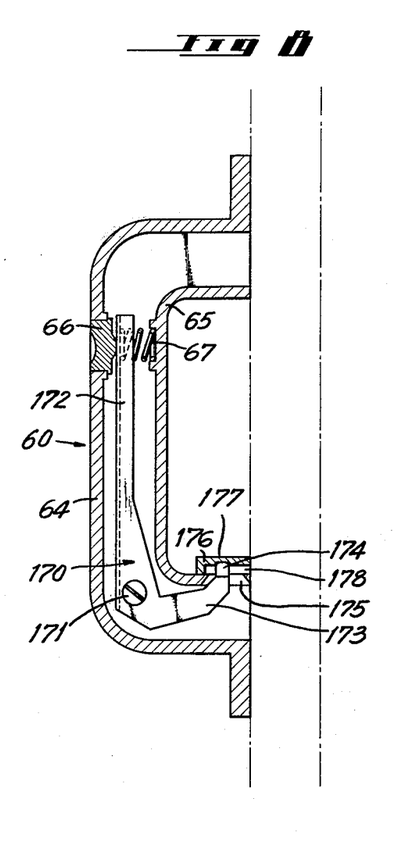
FIG. 8 is a side view in partial section illustrating the handle and associated components of the bundling mechanism of the embodiment illustrated in FIG. 7.
Figure 9:
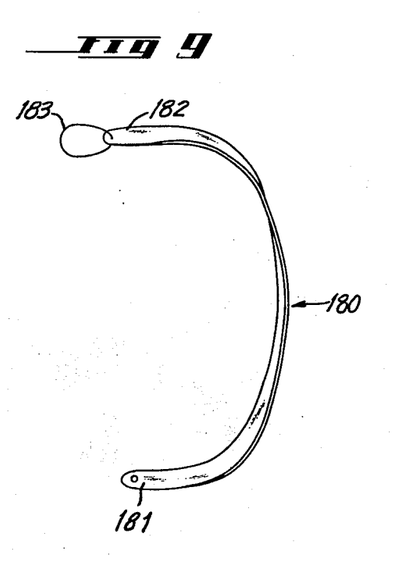
FIG. 9 is a perspective view illustrating a strap comprising a component of the bundling mechanism of the embodiment of the photographic tripod apparatus illustrated in FIG. 7.

FIG. 7 illustrates a second embodiment of photographic tripod apparatus according to the present invention wherein the legs thereof are closed together by a bundling mechanism As in the case of the embodiment illustrated in FIGS. 1-6, the FIG. 7 embodiment of the apparatus includes a handle 60 mounted on a leg 12. As seen in FIG. 8, a latch lever 170 is rotatably mounted within the hollow interior of handle 60 about a pivot pin 171. An inner end 172 of latch lever 170 is biased by a spring 67 against a button 66. In this respect, the design of the embodiment illustrated in FIGS. 7 and 8 is similar to that described above in connection with FIGS. 1-6.

An outer end 173 of latch lever 170 has a hook-shape configuration terminating at a sloped hook tip 174. The hook tip 174 projects externally from the interior of the handle 60 through a substantially conical opening 175 formed in an inner wall 65 of handle 60. A guide plate 176 is fixed to the exterior of the inner wall 65 and includes a portion which is in spaced, opposed relationship to the opening 175. A recess 177 is formed in the opposed portion of guide plate 176 at a location adapted to receive the hook tip 174 of latch lever 170 as seen in FIG. 8. The portion of guide plate 176 which is opposed to the opening 175 defines a lateral slit 178.

A strap 180 formed of flexible material is associated with the handle 60 and comprises a component of the bundling mechanism of the present invention. Thus, the strap 180 is pivotally mounted at one end 181 on the outer surface of handle 60. The other end 182 of strap 180 is provided with means for engaging the hook tip 174 of latch lever 170 and in the illustrated embodiment, a ring 183 (FIG. 9) is provided on end 182.

In operation, after the legs 11, 12 and 13 are closed, the same are wrapped together with strap 180 whereupon the ring 183 is inserted into the lateral slit 178 to achieve a bundling of the legs 11, 12 and 13. More particularly, in its normal position, the hook tip 174 of the latch lever 170 extends into the recess 177 in guide plate 176. When the ring 183 is urged against the sloped surface of the tip 174, the latter is urged downwardly under the camming action of the sloped edge thereof so that the ring 183 is automatically engaged with the hook-shaped end 173 of the latch lever 170. In order to disengage the ring 183 from the hook-shaped end 173, the button 66 is depressed whereupon the end 173 of latch lever 170 retracts into the handle 60 so that the ring 183 may be automatically urged out from slit 178 under the resilient forces of the strap itself. During use of the tripod, the strap 180 may be stored around the leg 12 or handle 60 in any suitable manner with the ring 183 remaining within the slit 178 without obstructing or inhibiting the photographing operation.

Figure 10:
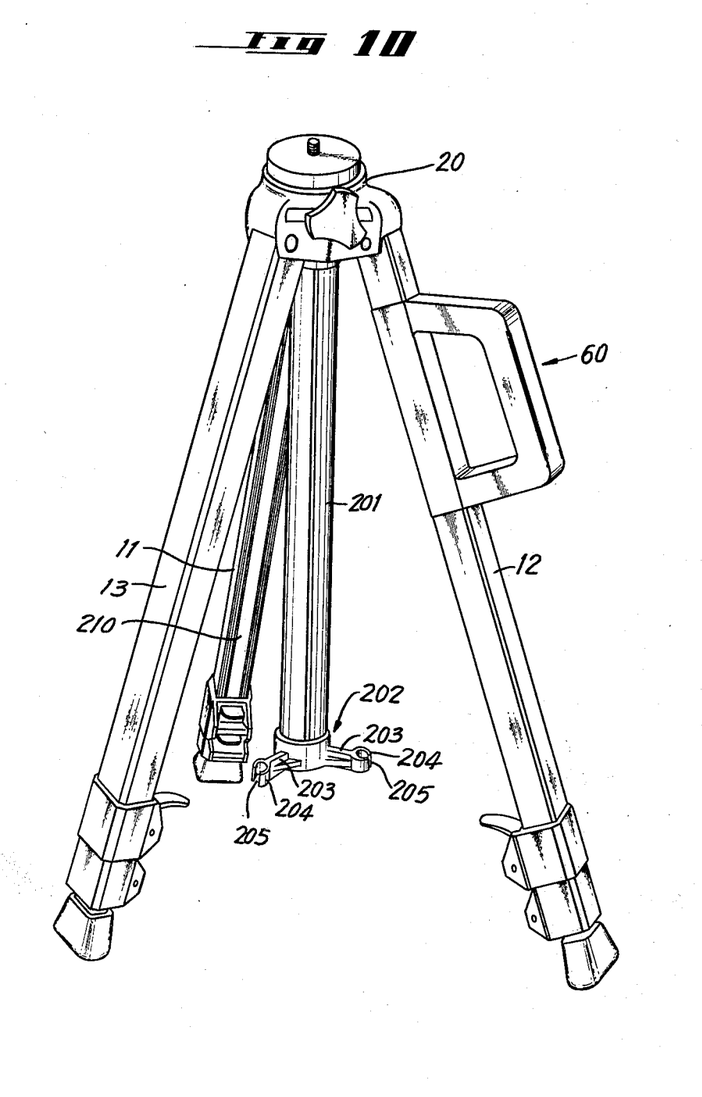
FIG. 10 is a perspective view illustrating a third embodiment of photographic tripod apparatus according to the present invention.

A third embodiment of the tripod apparatus of the present invention is illustrated in FIG. 10. The tripod apparatus includes a handle 60 as in the case of the embodiment of the invention described immediately above. However, the handle 60 merely comprises a hollow member, preferably formed of a resin material, without any mechanism being provided in the interior thereof.

A bundling mechanism is provided comprising a connector member 202 mounted around a bushing 201 adapted to engage means provided on the legs 11, 12 and 13 to hold the latter in their collapsed position along the bushing 201 so that the tripod can be reliably and easily transferred by holding the handle 60.

More particularly, the connector member 202 comprises three radially extending connecting elements, each of which comprises a radially extending arm 203 provided at its free end with a flexible fork-shaped connecting piece 204 defining a ring having a slit 205 at its front side. Each of the legs is formed with axially extending recesses 210 defined by substantially U-shaped members formed by the inner sides of the respective legs. The U-shaped members taper upwardly.

When it is desired to transfer the tripod from one location to another, the legs are moved inwardly toward the bushing 201 whereupon the connecting pieces 204 may be inserted into the recesses 210 associated with the respective legs, the respective connecting pieces 204 being temporarily compressed between the narrow jaws of the respective recesses 210 and expanded upon being inserted into the inner cavities thereof so as to be effectively engaged within the respective recesses. In this manner, the respective legs 11, 12 and 13 are maintained collapsed together along the bushing 201 so that the tripod can be reliably and easily transferred by holding the handle 60.

Photographic tripod apparatus constructed according to the present invention provide significantly advantageous operation. Thus, with respect to the first embodiment described above in connection with FIGS. 1-6, the legs thereof can be collapsed together with the handle being held by one hand since the legs are maintained under the action of the latch mechanism and, therefore, the tripod can be directly carried with the handle held by the hand. Furthermore, simply by depressing the button while holding the handle in the same hand, it is possible to disengage the pin from the notch immediately so that the legs can be readily opened. Thus, according to the first described embodiment, the present invention provides a photographing tripod which can be reliably and easily operated in both opening and closing the legs as well as in transferring the tripod from one location to another. In the second and third embodiments described above, the legs can be bundled together by the bundling mechanism and transferred with the handle being held by the hand in a more reliable and easier manner than in the case of conventional tripods which are provided with a hanging strap or which are carried by grasping the legs together. Moreover, the provision of the handle on one of the legs improves not only the transportability of the tripod apparatus but, additionally, the esthetic appearance of the same. Furthermore, the provision of the handle advantageously eliminates any danger of the operator's hand being caught between the legs and the bushing of the tripod upon the legs being collapsed.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Photographic tripod apparatus comprising: a base plate; a set of legs, each of which is pivotally mounted on one of its ends to said base plate; an elongate elevator support extending through said base plate; a sleeve-type bushing situated over said elongate elevator support and extending downwardly from an under surface of said base plate to at least partially enclose said elevator support; a slidable member situated over the outer peripheral surface of said bushing so as to be vertically slidable thereover; a linkage assembly including a set of rods, each of which is pivotally mounted at one of its ends to a respective one of said legs and at its other end to said slidable member, whereby said legs are operatively coupled to said slidable member so that movement of said slidable member to a particular position on said bushing causes said legs to pivot to a collapsed position; a handle member provided on one of said legs adapted to be held by a single hand whereby the apparatus can be carried thereby; and latching means extending between said handle and slidable members for holding said legs in the collapsed position, said latching means being adapted to be operated by the same hand holding said handle member.

2. The combination of claim 1 wherein said handle member is substantially U-shaped.

3. The combination according to claims 1 or 2 wherein said latching means comprise a substantially L-shaped latch lever having an inner and an outer end, said lever being pivotally mounted on said handle member, and a pin mounted on said slidable member so as to be engageable with said outer end of said latch lever.

4. The combination of claim 3 wherein said handle member has a hollow interior portion, said latch lever is pivotally mounted within said handle member interior, and said outer end of said latch lever projects outwardly from the interior of said handle member.

5. The combination of claim 4 wherein said latching means further comprises a button mounted in an outer wall of said handle member movable between an outer and an inner position, and spring means operatively associated with said latch lever for biasing said inner end of said latch lever against said button so that said button is normally biased to its outer position.

6. The combination of claim 5 wherein said spring means comprises a spring interposed between said inner end of said latch lever and an inner wall of said handle member.

7. The combination of claim 6 wherein said pin is mounted on an outwardly extending fin formed on said slidable member.

8. The combination of claim 3 wherein said outer end of said latch lever and said pin are adapted to be in proximate latching relationship when said slidable member is in said position on said bushing wherein said legs are in their collapsed position.

9. The combination of claim 8 wherein the terminal edge of said outer end of said latch lever is slanted whereby the latch lever is rotated when said pin is urged thereagainst.

10. Photographic tripod apparatus comprising: a base plate; a set of legs, each of which is pivotally mounted at one of its ends to said base plate; a substantially U-shaped handle member provided on one of said legs adapted to be held by a single hand whereby the apparatus can be carried thereby; and means for releasably bundling said legs together, said bundling means being adapted to be released by the same hand holding said handle member and comprising a substantially L-shaped latch lever having an inner end and an outer end, said lever being pivotally mounted on said handle member, and an elongate strap having one of its ends connected in the region of said handle member and the other of its ends provided with fastener means for engaging said outer end of said latch lever.

11. The combination of claim 10 wherein said bundling means further comprise spring means for urging said latch lever to a latched position.

12. The combination of claim 11 wherein said outer end of said latch lever comprises a hook-shaped portion and further including a guide plate defining a slit in which said hook-shaped portion is located when in said latched position.

13. The combination of claim 12 wherein said hook-shaped portion has a sloped edge whereby upon urging said fastener means thereagainst, said latch lever is pivoted.

14. The combination of claim 10 wherein said fastener means comprises a ring member affixed to said other end of said strap.

15. Photographic tripod apparatus comprising: a base plate; a set of legs, each of which is pivotally mounted at one of its ends to said base plate; a substantially U-shaped handle member provided on one of said legs adapted to be held by a single hand whereby the apparatus can be carried thereby; means for releasably bundling said legs together; and wherein said apparatus further comprises an elongate sleeve-type bushing extending downwardly from said base plate, and wherein said bundling means comprise a connector member mounted around said bushing including a set of connecting elements radially projecting therefrom, each connecting element extending into opposed relationship to a respective one of said legs, and wherein said legs are provided with means for engaging respective ones of said connecting elements of said connector member.

16. The combination of claim 15 wherein each of said connecting elements comprises a radially extending arm having a flexible fork-shaped portion at its free end and wherein said engaging means provided on said legs comprise U-shaped members formed on the inner sides of the respective legs.

* * * * *